UNITED STATES PATENT OFFICE.

ERNST BERNHEIM, OF DUSSELDORF, GERMANY, ASSIGNOR OF ONE-HALF TO CHARLES F. BURGESS, OF MADISON, WISCONSIN, AND ONE-HALF TO C. J. KIRK, OF NEW CASTLE, PENNSYLVANIA.

PROCESS OF COATING IRON, STEEL, OR OTHER METALS WITH METAL.

1,244,414.     Specification of Letters Patent.     Patented Oct. 23, 1917.

No Drawing.     Application filed March 20, 1914. Serial No. 825,993.

*To all whom it may concern:*

Be it known that I, ERNST BERNHEIM, engineer, a subject of the King of Prussia, residing at Dusseldorf, Wilhelmplatz 3–8, Germany, have invented certain new and useful Improvements in Process of Coating Iron, Steel, or other Metals with Metal, of which the following is a specification.

My invention refers to an improvement of the processes of coating iron, steel or other metals with zinc, copper or the like by covering the metals to be coated with the coating material or its alloys in comminuted form and applying heat thereto. Such processes are known and referred to in the German Patents 134594, 186189, U. S. Patent 701298 of June 3rd, 1902, German Patents 251414 and 252664 and corresponding U. S. patents, granted to Charles Frederiek Burgess.

In particular my invention refers to other processes by which the coating material is mixed with other materials inert to said coating material. Such materials of addition heretofore have been chiefly oxids of metals, carbon, silica, sand or the like. (Compare German Patent 205902, U. S. Pat. 910369 of Jan. 19, 1909.) The addition of such materials causes an improvement in the formation of metal coatings.

The purpose of my invention is to improve the color of the resultant product as well as to reduce as far as possible the time now required with these processes for heating as well as for cooling off and to thus make the entire process more economical. My invention consists in the use of added materials of good heat conductivity instead of, or together with the added materials heretofore used. As such materials may be used metals or alloys of metals, such as aluminium, or alloys of same, or magnesium, nickel, or alloys of same, individually or combined, all in comminuted form.

The process may be applied, for example, in the following manner: I fill an iron receptacle with iron parts having clean metallic surface embedded in a mixture of 50% zinc dust and 50% granulated aluminium. The zinc dust always contains a certain amount of oxid of zinc. I then close the receptacle in a more or less gas tight manner and while rotating it constantly or moving it intermittently I heat it gradually to a temperature below the melting point of zinc, which temperature may be maintained for a certain period of time, as the case may require. When cooled off the receptacle is opened and the iron parts now coated with zinc of clear color may be removed.

The time required for heating and cooling off when employing this method was about 40% of that required when using zinc dust alone or a mixture of zinc dust and sand.

The same procedure may take place when using comminuted dross or ferro-zinc instead of zinc dust, the process not being confined to the above named substances, but being applicable to other materials and proportions as well. Materials other than iron may be coated and materials other than aluminium, such as magnesium, nickel, iron or alloys of the same or other metals or alloys of metals may be used as material of addition as long as they are good conductors of heat and suit other conditions of the process. Such metals or alloys of metals may also be mixed with the materials of addition already known, such as silica.

I claim the following advantages brought about by the use of metallic materials of addition being good conductors of heat: Time required for heating as well as for cooling off is considerably reduced. The result is higher production, saving in fuel, labor and power. Furthermore the temperature at which the coating is formed is lower, perhaps owing to the higher specific heat and the reducing action of the material of addition. Furthermore the weight of the mixture when using aluminum or its alloys is smaller than that of the mixture with sand or than zinc dust alone. The addition of aluminium or alloys of same also produces a better color of the coating which is of particular importance in connection with the use of ferrozinc as coating material.

Having described my invention, what I claim is:

1. The method of coating articles of iron or the like to protect them with zinc, which consists in heating the articles in a comminuted material consisting mainly of zinc and aluminium, until the articles take on a protective covering, substantially as described.

2. The method of coating iron articles to protect them with zinc, which consists in heating the articles in a mixture composed mainly of zinc dust and comminuted aluminium, until the articles take on a protective covering, substantially as described.

3. The method of coating articles of iron to protect them with zinc, which consists in heating and agitating the articles in a comminuted material consisting essentially of about 50% zinc dust and 50% granulated aluminium, until the articles take on a protective covering, substantially as described.

In testimony whereof I affix my signature in presence of two witnesses.

ERNST BERNHEIM. [L.S.]

Witnesses:
HELEN NUFER,
ALBERT NUFER.